US008868475B2

(12) United States Patent
Zhang et al.

(10) Patent No.: US 8,868,475 B2
(45) Date of Patent: Oct. 21, 2014

(54) SYSTEMS AND METHODS FOR DATA PROCESSING USING SOFT DATA SHAPING

(75) Inventors: Fan Zhang, Milpitas, CA (US); Jun Xiao, Fremont, CA (US); Ming Jin, Fremont, CA (US); Haitao Xia, San Jose, CA (US)

(73) Assignee: LSI Corporation, San Jose, CA (US)

( * ) Notice: Subject to any disclaimer, the term of this patent is extended or adjusted under 35 U.S.C. 154(b) by 178 days.

(21) Appl. No.: 13/561,230

(22) Filed: Jul. 30, 2012

(65) Prior Publication Data

US 2014/0032454 A1    Jan. 30, 2014

(51) Int. Cl.
*G06N 3/12* (2006.01)
(52) U.S. Cl.
CPC . *G06N 3/126* (2013.01); *G06N 3/12* (2013.01)
USPC .............................................. 706/13; 706/45
(58) Field of Classification Search
None
See application file for complete search history.

(56) References Cited

U.S. PATENT DOCUMENTS

| 7,113,356 | B1 | 9/2006 | Wu |
| 2006/0256670 | A1 | 11/2006 | Park |
| 2011/0164669 | A1 | 7/2011 | Mathew |

OTHER PUBLICATIONS

Segonne, Segmentation of Medical Images under Topological Constraints, Doctoral Thesis, Massachusetts Institute of Technology, Dec. 2005, pp. 1-142.*
U.S. Appl. No. 13/558,245, Unpublished (filed Jul. 25, 2012) (Fan Zhang).
U.S. Appl. No. 13/560,702, Unpublished (filed Jul. 27, 2012) (Fan Zhang).
U.S. Appl. No. 13/552,403, Unpublished (filed Jul. 18, 2012) (Fan Zhang).
U.S. Appl. No. 13/400,750, Unpublished (filed Feb. 21, 2012) (Fan Zhang).
U.S. Appl. No. 138433,742, Unpublished (filed Mar. 29, 2012) (Fan Zhang).
U.S. Appl. No. 13/342,240, Unpublished (filed Jan. 3, 2012) (Shaohua Yang).
U.S. Appl. No. 13/316,953, Unpublished (filed Dec. 12, 2011) (Haitao Xia).
U.S. Appl. No. 13/340,974, Unpublished (filed Dec. 30, 2011) (Dan Liu).
U.S. Appl. No. 13/445,848, Unpublished (filed Apr. 12, 2012) (Bruce Wilson).
U.S. Appl. No. 13/251,342, Unpublished (filed Oct. 3, 2011) (Haitao Xia).

* cited by examiner

*Primary Examiner* — Wilbert L Starks
(74) *Attorney, Agent, or Firm* — Hamilton DeSanctis & Cha

(57) ABSTRACT

The present inventions are related to systems and methods for data processing, and more particularly to systems and methods for manipulating soft data in a data processing system.

20 Claims, 5 Drawing Sheets

SYSTEMS AND METHODS FOR DATA PROCESSING USING SOFT DATA SHAPING

BACKGROUND OF THE INVENTION

The present inventions are related to systems and methods for data processing, and more particularly to systems and methods for manipulating soft data in a data processing system.

Various data transfer systems have been developed including storage systems, cellular telephone systems, radio transmission systems. In each of the systems data is transferred from a sender to a receiver via some medium. For example, in a storage system, data is sent from a sender (i.e., a write function) to a receiver (i.e., a read function) via a storage medium. In some cases, the data processing function uses one or more iterations through a combination of a data detector circuit and a data decoder circuit. Depending upon a number of factors, different data sets require more or fewer iterations through the combination of the data detector circuit and data decoder circuit, and in some cases a data set will not converge regardless of the number of iterations.

Hence, for at least the aforementioned reasons, there exists a need in the art for advanced systems and methods for data processing.

BRIEF SUMMARY OF THE INVENTION

The present inventions are related to systems and methods for data processing, and more particularly to systems and methods for manipulating soft data in a data processing system.

Various embodiments of the present invention provide data processing systems that include a data detector circuit and a data shaping circuit. The data detector circuit is operable to apply a data detection algorithm to a data set to yield a detected output. The data shaping circuit operable to: generate a shaping map based at least in part on a genetic algorithm during a training mode; and reshape the detected output using the shaping map to yield a shaped output during an operational mode.

This summary provides only a general outline of some embodiments of the invention. The phrases "in one embodiment," "according to one embodiment," "in various embodiments", "in one or more embodiments", "in particular embodiments" and the like generally mean the particular feature, structure, or characteristic following the phrase is included in at least one embodiment of the present invention, and may be included in more than one embodiment of the present invention. Importantly, such phases do not necessarily refer to the same embodiment. Many other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF SOME EMBODIMENTS OF THE INVENTION

The present inventions are related to systems and methods for data processing, and more particularly to systems and methods for manipulating soft data in a data processing system.

It has been discovered that information divergence provides a reasonable indication of data quality. As such, some embodiments of the present invention provide for data processing based at least in part on information divergence. In some cases, the information divergence is used as a proxy for sector quality. The sector quality measurement may be used to help shape the soft data available at the output of a data detector circuit. The shaped data may then be introduced to a data decoder circuit for application of a data decoding algorithm.

Various embodiments of the present invention provide data processing systems that include a data detector circuit and a data shaping circuit. The data detector circuit is operable to apply a data detection algorithm to a data set to yield a detected output. The data shaping circuit operable to: generate a shaping map based at least in part on a genetic algorithm during a training mode; and reshape the detected output using the shaping map to yield a shaped output during an operational mode. In some instances of the aforementioned embodiments, the data shaping circuit includes a genetic algorithm based calculation circuit and a quality determination circuit. The genetic algorithm based calculation circuit is operable to: select a first map and a second map; generate a mutation map based at least in part on a combination of the first map and the second map; remap the detected output using the first map to yield a first output; remap the detected output using the second map to yield a second output; and remap the detected output using the mutation map to yield a mutation output. The quality determination circuit is operable to: calculate a first quality metric based at least in part on the first output; calculate a second quality metric based at least in part on the second output; and calculate a third quality metric based at least in part on the mutation output. The genetic algorithm based calculation circuit is further operable to: replace the first map with the mutation map when the first quality metric is worse than both the second quality metric and the third quality metric; and replace the second map with the mutation map when the second quality metric is worse than both the first quality metric and the third quality metric. In some cases, the data shaping circuit further includes a soft data mapping circuit operable to store the first map to a mapping memory.

Figure 1:
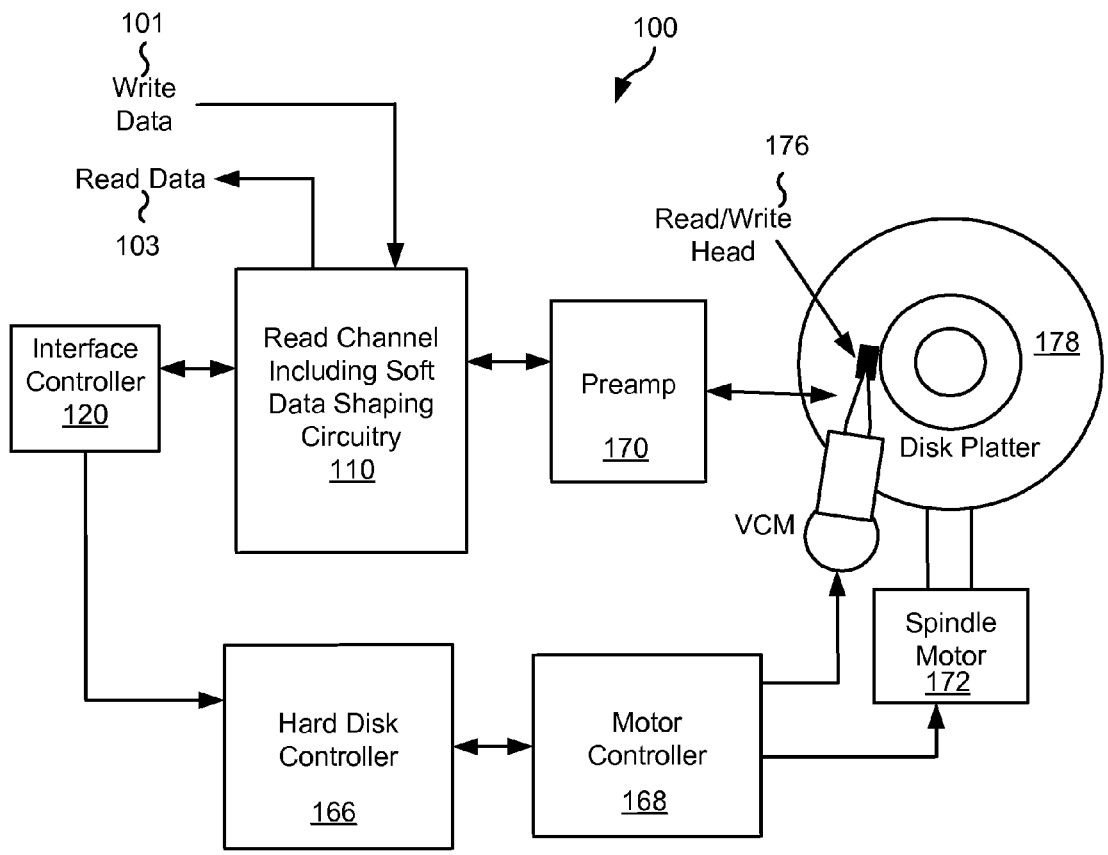
FIG. 1 shows a storage system including soft data shaping circuitry in accordance with various embodiments of the present invention.

Turning to FIG. 1, a storage system 100 including a read channel circuit 110 having soft data shaping circuitry is shown in accordance with various embodiments of the present invention. Storage system 100 may be, for example, a hard disk drive. Storage system 100 also includes a preamplifier 170, an interface controller 120, a hard disk controller 166, a motor controller 168, a spindle motor 172, a disk platter 178, and a read/write head 176. Interface controller 120 controls addressing and timing of data to/from disk platter 178, and interacts with a host controller 190 that includes out of order constraint command circuitry. The data on disk platter 178 consists of groups of magnetic signals that may be detected by read/write head assembly 176 when the assembly is properly positioned over disk platter 178. In one embodiment, disk platter 178 includes magnetic signals recorded in accordance with either a longitudinal or a perpendicular recording scheme.

In a typical read operation, read/write head assembly 176 is accurately positioned by motor controller 168 over a desired data track on disk platter 178. Motor controller 168 both positions read/write head assembly 176 in relation to disk platter 178 and drives spindle motor 172 by moving read/write head assembly to the proper data track on disk platter 178 under the direction of hard disk controller 166. Spindle motor 172 spins disk platter 178 at a determined spin rate (RPMs). Once read/write head assembly 176 is positioned adjacent the proper data track, magnetic signals representing data on disk platter 178 are sensed by read/write head assembly 176 as disk platter 178 is rotated by spindle motor 172. The sensed magnetic signals are provided as a continuous, minute analog signal representative of the magnetic data on disk platter 178. This minute analog signal is transferred from read/write head assembly 176 to read channel circuit 110 via preamplifier 170. Preamplifier 170 is operable to amplify the minute analog signals accessed from disk platter 178. In turn, read channel circuit 110 decodes and digitizes the received analog signal to recreate the information originally written to disk platter 178. This data is provided as read data 103 to a receiving circuit. A write operation is substantially the opposite of the preceding read operation with write data 101 being provided to read channel circuit 110. This data is then encoded and written to disk platter 178.

As part of processing the received information, read channel circuit 110 applies a data detection algorithm by a data detector circuit to the received data set to yield a detected output. Soft information from the detected output is used to calculate a quality metric. The quality metric may be an information divergence value. A genetic algorithm is applied to a grouping of random sets of soft data during a training period and the quality metric is re-calculated. This process of re-calculating the quality metric based upon random sets of soft data is repeated a number of times to determine which of the random set of soft data provides the best quality metric. The data set providing the best quality metric is stored to a mapping table. Once the training is complete, the mapping table is used to re-map soft data received from the data detector circuit to provide a decoder input to which a data decoding algorithm is applied. In some cases, read channel circuit 110 may be implemented similar to that discussed in relation to FIG. 3 below; and/or may operate similar to the methods discussed below in relation to FIGS. 4a-4c below.

It should be noted that storage system 100 may be integrated into a larger storage system such as, for example, a RAID (redundant array of inexpensive disks or redundant array of independent disks) based storage system. Such a RAID storage system increases stability and reliability through redundancy, combining multiple disks as a logical unit. Data may be spread across a number of disks included in the RAID storage system according to a variety of algorithms and accessed by an operating system as if it were a single disk. For example, data may be mirrored to multiple disks in the RAID storage system, or may be sliced and distributed across multiple disks in a number of techniques. If a small number of disks in the RAID storage system fail or become unavailable, error correction techniques may be used to recreate the missing data based on the remaining portions of the data from the other disks in the RAID storage system. The disks in the RAID storage system may be, but are not limited to, individual storage systems such as storage system 100, and may be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

A data decoder circuit used in relation to read channel circuit 110 may be, but is not limited to, a low density parity check (LDPC) decoder circuit as are known in the art. Such low density parity check technology is applicable to transmission of information over virtually any channel or storage of information on virtually any media. Transmission applications include, but are not limited to, optical fiber, radio frequency channels, wired or wireless local area networks, digital subscriber line technologies, wireless cellular, Ethernet over any medium such as copper or optical fiber, cable channels such as cable television, and Earth-satellite communications. Storage applications include, but are not limited to, hard disk drives, compact disks, digital video disks, magnetic tapes and memory devices such as DRAM, NAND flash, NOR flash, other non-volatile memories and solid state drives.

In addition, it should be noted that storage system 100 may be modified to include solid state memory that is used to store data in addition to the storage offered by disk platter 178. This solid state memory may be used in parallel to disk platter 178 to provide additional storage. In such a case, the solid state memory receives and provides information directly to read channel circuit 110. Alternatively, the solid state memory may be used as a cache where it offers faster access time than that offered by disk platter 178. In such a case, the solid state memory may be disposed between interface controller 120 and read channel circuit 110 where it operates as a pass through to disk platter 178 when requested data is not available in the solid state memory or when the solid state memory does not have sufficient storage to hold a newly written data set. Based upon the disclosure provided herein, one of ordinary skill in the art will recognize a variety of storage systems including both disk platter 178 and a solid state memory.

Figure 2:
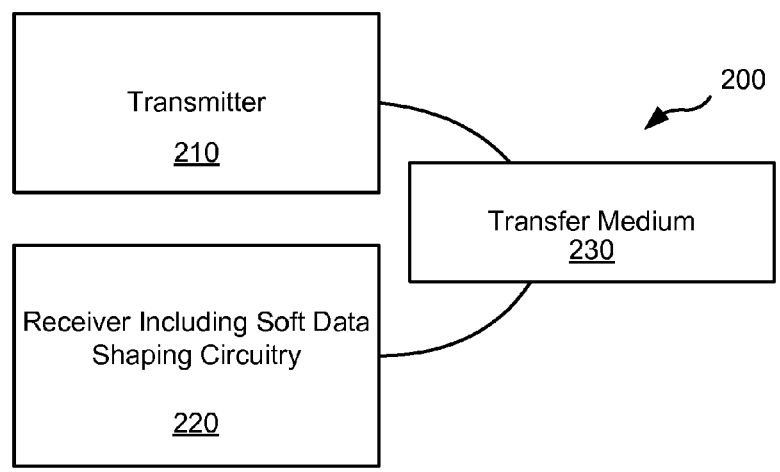
FIG. 2 depicts a data transmission system including soft data shaping circuitry in accordance with one or more embodiments of the present invention.

Turning to FIG. 2, a data transmission system 291 including a receiver 295 having soft data shaping circuitry is shown in accordance with various embodiments of the present invention. Data transmission system 291 includes a transmitter 293 that is operable to transmit encoded information via a transfer medium 297 as is known in the art. The encoded data is received from transfer medium 297 by a receiver 295. Receiver 295 processes the received input to yield the originally transmitted data.

As part of processing the received information, receiver 295 applies a data detection algorithm by a data detector circuit to the received data set to yield a detected output. Soft information from the detected output is used to calculate a quality metric. The quality metric may be an information divergence value. A genetic algorithm is applied to a grouping of random sets of soft data during a training period and the quality metric is re-calculated. This process of re-calculating the quality metric based upon random sets of soft data is repeated a number of times to determine which of the random set of soft data provides the best quality metric. The data set providing the best quality metric is stored to a mapping table. Once the training is complete, the mapping table is used to re-map soft data received from the data detector circuit to provide a decoder input to which a data decoding algorithm is applied. In some cases, the read channel circuit may be implemented similar to that discussed in relation to FIG. 3, and/or may operate similar to the methods discussed below in relation to FIGS. 4a-4c.

Figure 3:
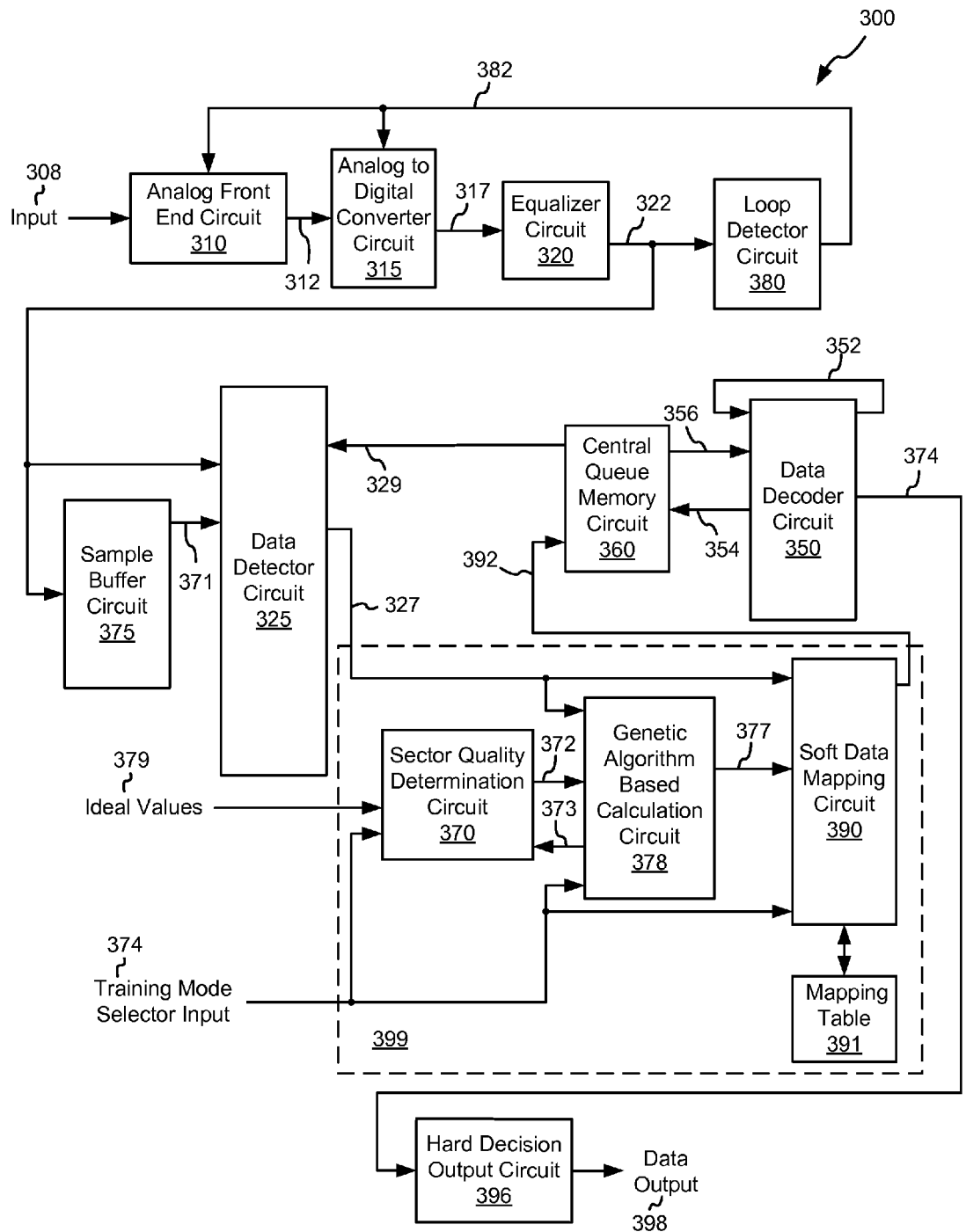
FIG. 3 shows a data processing circuit including soft data shaping circuitry in accordance with some embodiments of the present invention.

FIG. 3 shows a data processing circuit 300 including soft data shaping circuitry 399 (shown in dashed lines) in accordance with some embodiments of the present invention. Data processing circuit 300 includes an analog front end circuit 310 that receives an analog input signal 308. Analog front end circuit 310 processes analog input signal 308 and provides a processed analog signal 312 to an analog to digital converter circuit 315. Analog front end circuit 310 may include, but is not limited to, an analog filter and an amplifier circuit as are known in the art. Based upon the disclosure provided herein, one of ordinary skill in the art will recognize a variety of circuitry that may be included as part of analog front end circuit 310. In some cases, analog input signal 308 is derived from a read/write head assembly (not shown) that is disposed in relation to a storage medium (not shown). In other cases, analog input signal 308 is derived from a receiver circuit (not shown) that is operable to receive a signal from a transmission medium (not shown). The transmission medium may be wired or wireless. Based upon the disclosure provided herein, one of ordinary skill in the art will recognize a variety of source from which analog input signal 308 may be derived.

Analog to digital converter circuit 315 converts processed analog signal 312 into a corresponding series of digital samples 317. Analog to digital converter circuit 315 may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. Digital samples 317 are provided to an equalizer circuit 320. Equalizer circuit 320 applies an equalization algorithm to digital samples 317 to yield an equalized output 322. In some embodiments of the present invention, equalizer circuit 320 is a digital finite impulse response filter circuit as are known in the art. It may be possible that equalized output 322 may be received directly from a storage device in, for example, a solid state storage system. In such cases, analog front end circuit 310, analog to digital converter circuit 315 and equalizer circuit 320 may be eliminated where the data is received as a digital data input. Equalized output 322 is stored to a sample buffer circuit 375 that includes sufficient memory to maintain one or more codewords until processing of that codeword is completed through a data detector circuit 325 and a data decoder circuit 350 including, where warranted, multiple "global iterations" defined as passes through both data detector circuit 325 and data decoder circuit 350 and/or "local iterations" defined as passes through data decoding circuit 350 during a given global iteration. Sample buffer circuit 375 stores the received data as buffered data 371.

In addition, equalized output 322 is provided to a loop detector circuit 380 that provides feedback 382 operable to adjust the phase/frequency of sampling by analog to digital converter circuit 315 and/or various filter coefficients and gains applied by analog front end circuit 310. Loop detector circuit 380 may be any circuit known in the art that is capable of adjusting one or more of various filter coefficients applied by analog front end circuit 310, a variable gain applied by analog front end circuit 310, and/or the phase/frequency of sampling by analog to digital converter circuit 315.

Data detector circuit 325 may be any data detector circuit known in the art that is capable of producing a detected output 327. As some examples, data detector circuit 325 may be, but is not limited to, a Viterbi algorithm detector circuit or a maximum a posteriori detector circuit as are known in the art. Based upon the disclosure provided herein, one of ordinary skill in the art will recognize a variety of data detector circuits that may be used in relation to different embodiments of the present invention. Detected output 327 may include both hard decisions and soft decisions. The terms "hard decisions" and "soft decisions" are used in their broadest sense. In particular, "hard decisions" are outputs indicating an expected original input value (e.g., a binary '1' or '0', or a non-binary digital value), and the "soft decisions" indicate a likelihood that corresponding hard decisions are correct. Based upon the disclosure provided herein, one of ordinary skill in the art will recognize a variety of hard decisions and soft decisions that may be used in relation to different embodiments of the present invention.

Detected output 327 is provided to soft data shaping circuitry 399. As more fully described below, soft data shaping circuitry 399 is operable to map soft data received as part of detected output 327 to a decoder input 392. For example, in some instances of the present embodiment, detected output 327 includes a number of two bit symbols and each two bit symbol includes four soft data elements that may be for example, log likelihood ratio (LLR) data corresponding to respective ones of the four possible values for the two bit symbols (e.g., LLR0, LLR1, LLR3 and LLR4). This set of four soft data elements are mapped to corresponding four soft data elements (e.g., LLR0', LLR1', LLR2' and LLR4') that are provided as part of decoder input 392.

Decoder input 392 is provided to a central queue memory circuit 360 that operates to buffer data passed between data detector circuit 325 and data decoder circuit 350. When data decoder circuit 350 is available, data decoder circuit 350 receives decoder input 392 from central queue memory 360 as a decoder input 356. Data decoder circuit 350 applies a data decoding algorithm to decoder input 356 in an attempt to recover originally written data. The result of the data decoding algorithm is provided as a decoded output 354. Similar to detected output 327, decoded output 354 may include both hard decisions and soft decisions. For example, data decoder circuit 350 may be any data decoder circuit known in the art that is capable of applying a decoding algorithm to a received input. Data decoder circuit 350 may be, but is not limited to, a low density parity check decoder circuit or a Reed Solomon decoder circuit as are known in the art. Based upon the disclosure provided herein, one of ordinary skill in the art will recognize a variety of data decoder circuits that may be used in relation to different embodiments of the present invention. Where the original data is recovered (i.e., the data decoding algorithm converges) or a timeout condition occurs, data decoder circuit 350 provides the result of the data decoding algorithm as a data output 374. Data output 374 is provided to a hard decision output circuit 396 where the data is reordered before providing a series of ordered data sets as a data output 398.

One or more iterations through the combination of data detector circuit 325 and data decoder circuit 350 may be made in an effort to converge on the originally written data set. As mentioned above, processing through both the data detector circuit and the data decoder circuit is referred to as a "global iteration". For the first global iteration, data detector circuit 325 applies the data detection algorithm without guidance from a decoded output. For subsequent global iterations, data detector circuit 325 applies the data detection algorithm to buffered data 377 as guided by decoded output 354. Decoded output 354 is received from central queue memory 360 as a detector input 329.

During each global iteration it is possible for data decoder circuit 350 to make one or more local iterations including application of the data decoding algorithm to decoder input 356. For the first local iteration, data decoder circuit 350 applies the data decoder algorithm without guidance from a decoded output 352. For subsequent local iterations, data decoder circuit 350 applies the data decoding algorithm to decoder input 356 as guided by a previous decoded output 352. In some embodiments of the present invention, a default of ten local iterations is allowed for each global iteration.

Soft data shaping circuitry 399 includes a sector quality determination circuit 370, a genetic algorithm based calculation circuit 378, and a soft data mapping circuit 390. Genetic algorithm based calculation circuit 378 applies a genetic algorithm guided by quality metric 372 of sector quality determination circuit 370. Genetic algorithm based calculation circuit 378 generates a number of different map sets (p1 to pn). In some cases, these map sets may be generated externally and provided to genetic algorithm based calculation circuit 378. Each of the map sets is capable of one to one mapping of replacement soft data provides as decoder input 392 to soft data from detected output 327. One of the generated map sets is selected as a first map and provided as pi mapping, and another of the generated map sets is selected as a second map and provided as pj mapping. In addition, genetic algorithm based calculation circuit 378 generates a mutation mapping from the pi mapping and the pj mapping. The mutation mapping is provided as p* mapping. As an example, where the pi mapping maps a particular input to a third output and the pj mapping maps an input that is the same as the third output to a fourth output, the mutation mapping would chain those together to map the particular input to the fourth output. This chaining approach is analogous to the generation of a child from two parents. Of note, the mutation process is pseudorandom and as such capable of resulting in a different mutation map each time a mutation of the same two mappings is performed.

Detected output 327 is remapped using the pi mapping to yield a pi output, detected output 327 is remapped using the pj mapping to yield a pj output, and detected output 327 is remapped using the p* mapping to yield a p* output. Each of the pi output, the pj output, and the p* output are provided via a soft data input 373 to sector quality determination circuit 370.

Sector quality determination circuit 370 calculates a quality metric for each of the pi output, the pj output, and the p* output received as soft data input 373. In some embodiments of the present invention, the quality metric is an information divergence value calculated in accordance with a Bregman divergence algorithm. In such embodiments, during a training mode indicated by assertion of a training mode selector input 374, a known data input is applied as input 308. This known data input corresponds to an ideal or known detected value 379 (corresponding to detected output 327). The soft data portion of ideal value 379 is used as an LLR_q(i) variable of a Bregman divergence algorithm and the pi output, the pj output, and the p* output are used respectively as an LLR_p(i) variable for distinct applications of the Bregman divergence algorithm shown below as the equation:

$$B(p\mid q) = \sum_{j=0}^{n-1} \sum_{i=0}^{M} [LLR\_p(i) - LLR\_q(i)],$$

where p and q are two probability mass functions, and M is the number of LLR values for each symbol. For example, in a two bit symbol system, M is equal to three (e.g., LLR0, LLR1, LLR2 and LLR3). A logarithm taken on the coefficients and normalized to (i.e., subtracted by) the log(p(i))(log(q(j))) and p_k(j)(q_k(j)) is the largest coefficient in p_k(q_k). The resulting vectors p' and q' are defined in the equations below:

$p'=[LLR\_p0, LLR\_p1, \ldots LLR\_pn];$ and $q'=[LLR\_q0, LLR\_q1, \ldots LLR\_qn],$ where n is the number of soft data elements in a sector of data received as detected output 327. These two vectors, p and q, are used in the Bregman divergence calculation set forth above.

Application of the information divergence calculation using the ideal values 379 as LLR_q(i) and the pi output as LLR_p(i), yields an information divergence value IDi; application of the information divergence calculation using the ideal values 379 as LLR_q(i) and the pj output as LLR_p(i), yields an information divergence value IDj; and application of the information divergence calculation using the ideal values 379 as LLR_q(i) and the p* output as LLR_p(i), yields an information divergence value ID*. Each of IDi, IDj and ID* are provided as quality metric 372 to genetic algorithm based calculation circuit 378.

Genetic algorithm based calculation circuit 378 selects the maximum one of IDi, IDj and ID* as the worst mapping. Where IDi is the worst mapping, the pi mapping is replaced by the p* mapping. Alternatively, where IDj is the worst mapping, the pj mapping is replaced by the p* mapping. Otherwise, no replacement of either the pi mapping or the pj mapping is performed. Genetic algorithm based calculation circuit 378 then repeats the process of generating a mutation mapping followed by selective replacement is repeated a defined number of times. Once the defined number of times are completed, the resulting pi mapping is provided as a map output 377 to soft data mapping circuit 390 which stores the map to a mapping table 391.

During an operational mode as indicated by de-assertion of training mode selector input 374, data quality determination circuit 370 and genetic algorithm based calculation circuit 378 are disabled, and soft data is received as part of detected output 327 is provided directly to soft data mapping circuit 390. Soft data mapping circuit 390 identifies the entry in mapping table (e.g., LLR0, LLR1, LLR2 and LLR3) corresponding to the soft data of detected output 327, and replaces the soft data of detected output 327 with the soft data corresponding to the lowest information divergence value (e.g., LLR0', LLR1', LLR2' and LLR3') that was previously stored in mapping table 391. The replacement values obtained from mapping table 391 are provided by soft data mapping circuit 390 as decoder input 392.

Figure 4A:
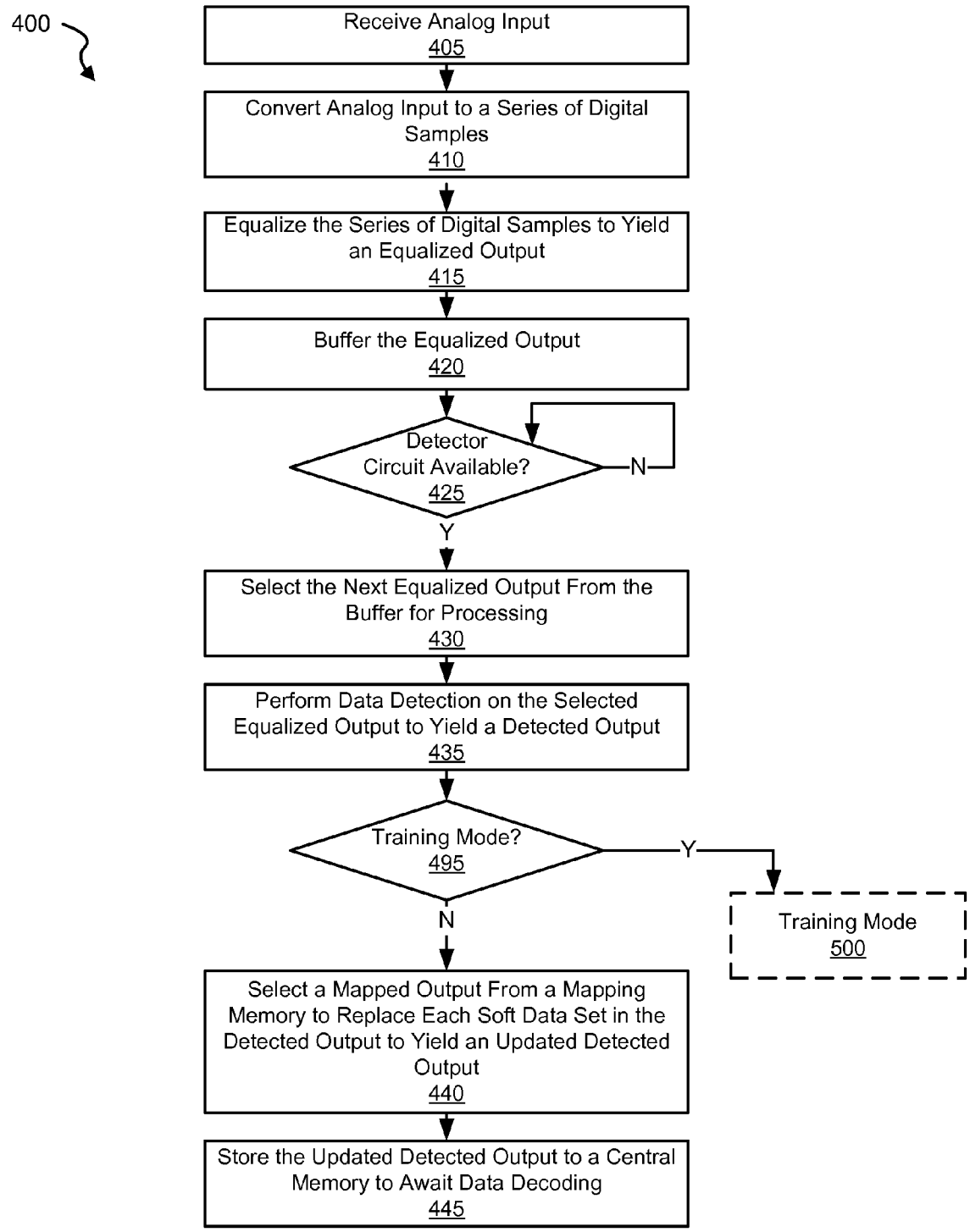
FIGS. 4a-4c are flow diagrams showing a method for soft data shaping in accordance with some embodiments of the present invention.
Figure 4B:
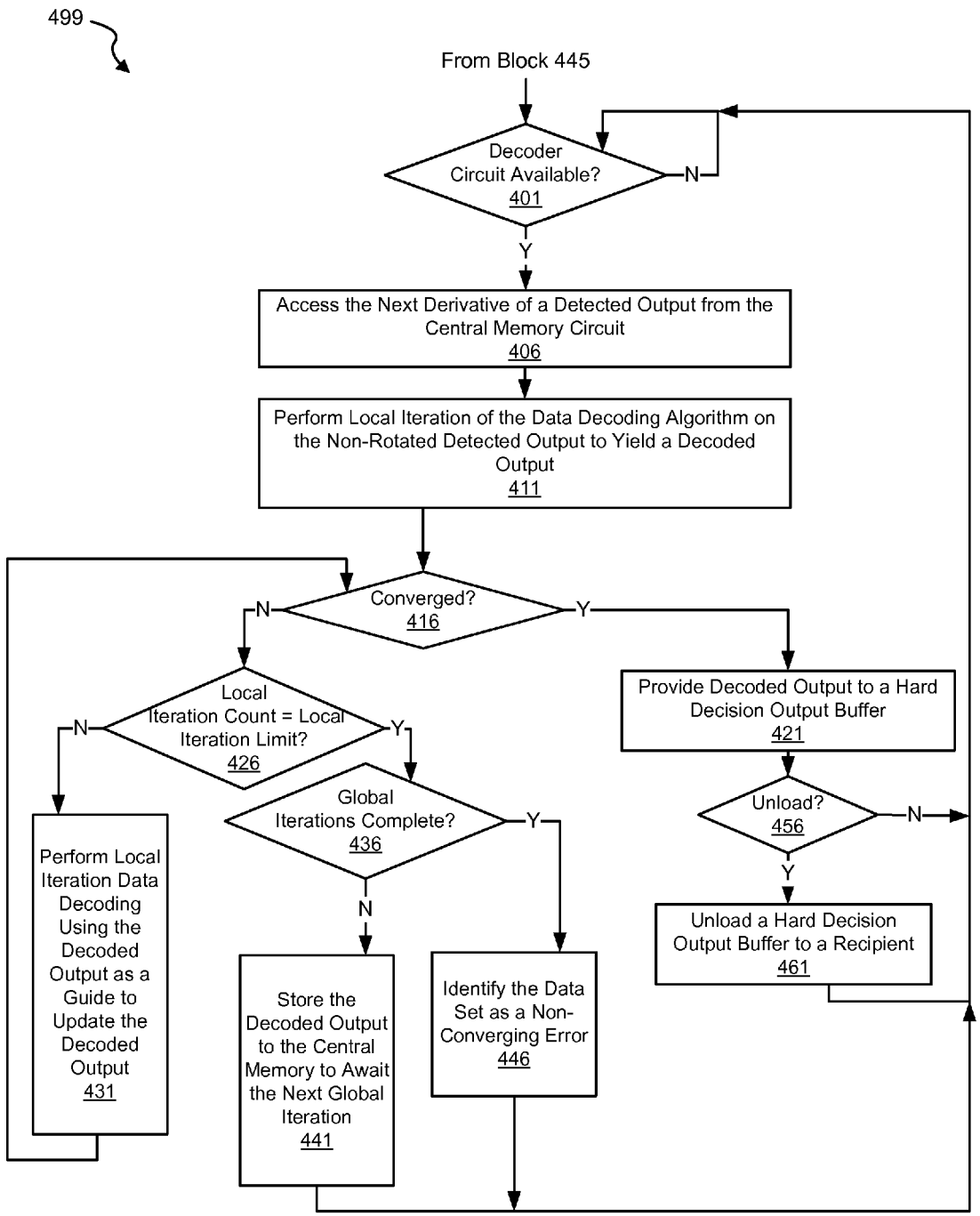
Figure 4C:
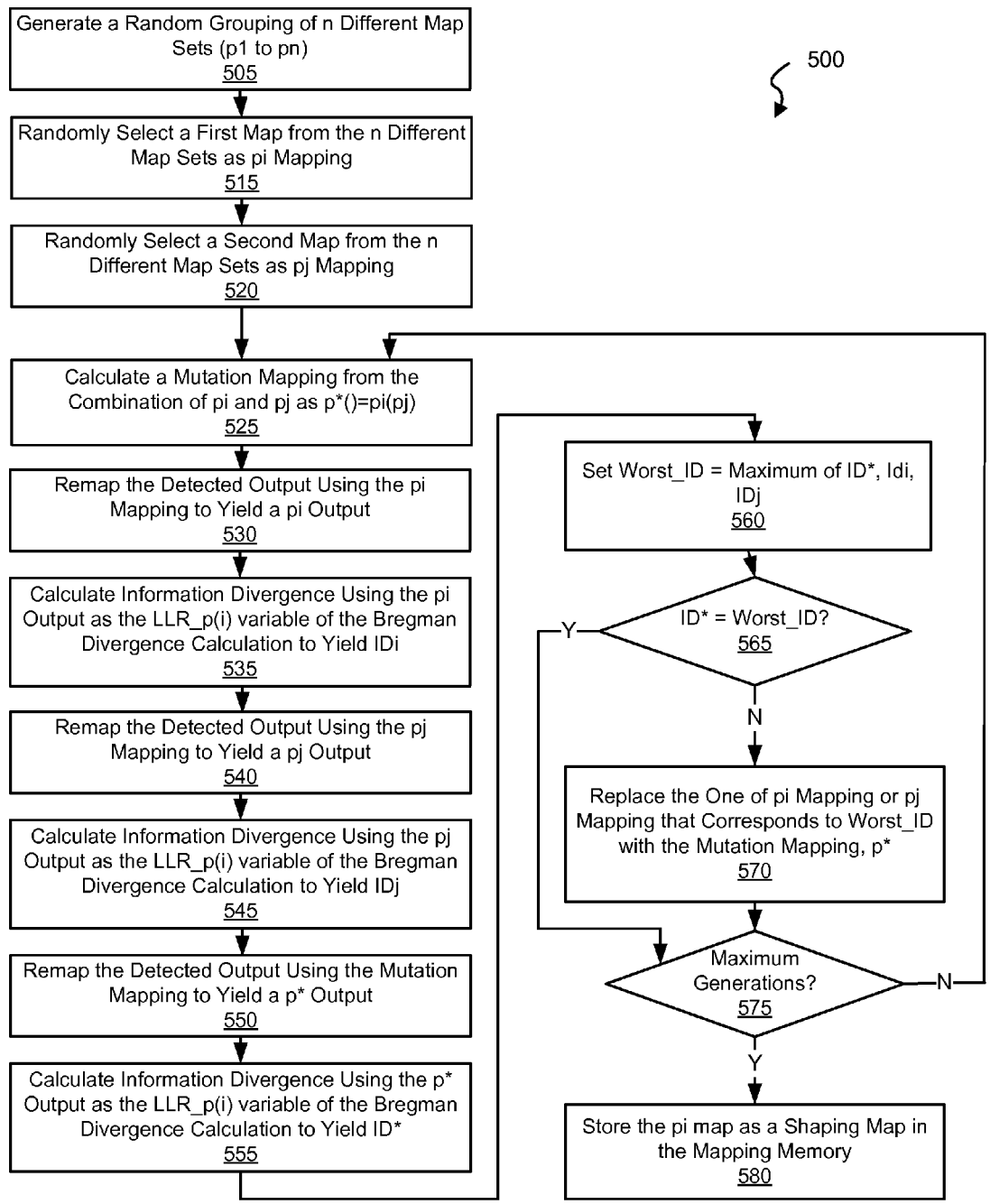

Turning to FIGS. 4a-4c are flow diagrams 400, 499, 500 showing a method for soft data shaping in accordance with some embodiments of the present invention. Following flow diagram 400 of FIG. 4a, an analog input is received (block 405). The analog input may be derived from, for example, a storage medium or a data transmission channel. Based upon the disclosure provided herein, one of ordinary skill in the art will recognize a variety of sources of the analog input. The analog input is converted to a series of digital samples (block 410). This conversion may be done using an analog to digital converter circuit or system as are known in the art. Of note, any circuit known in the art that is capable of converting an analog signal into a series of digital values representing the received analog signal may be used. The resulting digital samples are equalized to yield an equalized output (block 415). In some embodiments of the present invention, the equalization is done using a digital finite impulse response circuit as are known in the art. Based upon the disclosure provided herein, one of ordinary skill in the art will recognize a variety of equalizer circuits that may be used in place of such a digital finite impulse response circuit to perform equalization in accordance with different embodiments of the present invention. The equalized output is buffered (block 420).

It is determined whether a data detector circuit is available to process a data set (block 425). Where a data detector circuit is available to process a data set (block 425), the next equalized output from the buffer is accessed for processing (block 430). The data detector circuit may be, for example, a Viterbi algorithm data detector circuit or a maximum a posteriori data detector circuit. A data detection algorithm is applied to the accessed equalized output by the data detector circuit to yield a detected output (block 435).

It is determined whether a training mode is selected (block 495). A training mode may be selected, for example, by assertion of a programmable user input. Alternatively, a training mode may be selected during an initial use and de-selected once the training is complete. Based upon the disclosure provided herein, one of ordinary skill in the art will recognize a variety of approaches that may be used to select a training mode. In the training mode, a known input is provided that corresponds to an expected or ideal output. This ideal output corresponds to LLR_q(i) in the Bregman divergence calculation set forth in the following equation:

$$B(p \mid q) = \sum_{j=0}^{n-1} \sum_{i=0}^{M} [\mathrm{LLR\_p}(i) - \mathrm{LLR\_q}(i)],$$

where p and q are two probability mass functions, and M is the number of LLR values for each symbol. For example, in a two bit symbol system, M is equal to three (e.g., LLR0, LLR1, LLR2 and LLR3). Where the training mode is selected (block 495), a training process is performed to populate a mapping memory with replacement soft data used to replace specific incoming soft data values (flow diagram 500). Block 500 is discussed in more detail below in relation to flow diagram 500 of FIG. 4c.

Alternatively, where standard processing is selected (i.e., the training mode is not selected)(block 495), a mapped output is selected from a mapping memory to replace each soft data set in the detected output to yield an updated detected output (block 440). The mapping memory is populated using a training mode discussed below in relation to FIG. 4c. The updated detected output is stored to a central memory to await application of a data decoding algorithm (block 445).

Turning to FIG. 4b and following flow diagram 499, it is determined whether a data decoder circuit is available (block 401) in parallel to the previously described data detection process of FIG. 4a. The data decoder circuit may be, for example, a low density parity check data decoder circuit as are known in the art. Where the data decoder circuit is available (block 401) the next derivative of a detected output is selected from the central queue memory circuit (block 406). The derivative of the detected output may be, for example, an interleaved (shuffled) version of the updated detected output from the data detector circuit. A first local iteration of a data decoding algorithm is applied by the data decoder circuit to the selected detected output to yield a decoded output (block 411). It is then determined whether the decoded output converged (e.g., resulted in the originally written data as indicated by the lack of remaining unsatisfied checks) (block 416).

Where the decoded output converged (block 416), it is provided as a decoded output codeword to a hard decision output buffer (e.g., a re-ordering buffer) (block 421). It is determined whether the received output codeword is either sequential to a previously reported output codeword in which case reporting the currently received output codeword immediately would be in order, or that the currently received output codeword completes an ordered set of a number of codewords in which case reporting the completed, ordered set of codewords would be in order (block 456). Where the currently received output codeword is either sequential to a previously reported output codeword or completes an ordered set of codewords (block 456), the currently received output codeword and, where applicable, other codewords forming an in order sequence of codewords are provided to a recipient as an output (block 461).

Alternatively, where the decoded output failed to converge (e.g., errors remain) (block 416), it is determined whether the number of local iterations already applied equals the maximum number of local iterations (block 426). In some cases, a default seven local iterations are allowed per each global iteration. Based upon the disclosure provided herein, one of ordinary skill in the art will recognize another default number of local iterations that may be used in relation to different embodiments of the present invention. Where another local iteration is allowed (block 426), the data decoding algorithm is applied to the selected data set using the decoded output as a guide to update the decoded output (block 431). The processes of blocks starting at block 416 are repeated for the next local iteration.

Alternatively, where all of the local iterations have occurred (block 426), it is determined whether all of the global iterations have been applied to the currently processing data set (block 436). Where the number of global iterations has not completed (block 436), the decoded output is stored to the central queue memory circuit to await the next global iteration (block 441). Alternatively, where the number of global iterations has completed (block 436), an error is indicated and the data set is identified as non-converging (block 446).

Turning to FIG. 4c, a training process that results in a shaping map stored to the mapping memory is discussed. Following flow diagram 500, a random grouping of n different map sets (p1 to pn) is generated (block 505). Each of the map sets is capable of one to one mapping of replacement soft data to soft data from a detected output. One of the generated map sets is selected as a first map and provided as pi mapping (block 515), and another of the generated map sets is selected as a second map and provided as pj mapping (block 520). A mutation mapping is then generated from the first mapping and the second mapping and provided as p* mapping (block 525). The mutation mapping is a combination of the pi mapping and the pj mapping. As an example, where the pi mapping maps a particular input to a third output and the pj mapping maps an input that is the same as the third output to a fourth output, the mutation mapping would chain those together to map the particular input to the fourth output. This chaining approach is analogous to the generation of a child from two parents. Of note, the mutation process is pseudorandom and as such capable of resulting in a different mutation map each time a mutation of the same two mappings is performed.

The detected output from block 435 is remapped using the pi mapping to yield a pi output (block 530), and information divergence is calculated where the ideal output (that expected from a known input) corresponds to LLR_q(i) and the pi output corresponds to LLR_p(i) in the Bregman divergence calculation set forth in the following equation:

$$B(p \mid q) = \sum_{j=0}^{n-1} \sum_{i=0}^{M} [\text{LLR}\_p(i) - \text{LLR}\_q(i)],$$

where p and q are two probability mass functions, and M is the number of LLR values for each symbol (block 535). This yields IDi.

The detected output from block 435 is remapped using the pj mapping to yield a pj output (block 540), and information divergence is calculated where the ideal output (that expected from a known input) corresponds to LLR_q(i) and the pj output corresponds to LLR_p(i) in the Bregman divergence calculation set forth in the following equation:

$$B(p \mid q) = \sum_{j=0}^{n-1} \sum_{i=0}^{M} [\text{LLR}\_p(i) - \text{LLR}\_q(i)]$$

(block 545). This yields IDj.

The detected output from block 435 is remapped using the pj mapping to yield a p* output (block 550), and information divergence is calculated where the ideal output (that expected from a known input) corresponds to LLR_q(i) and the p* output corresponds to LLR_p(i) in the Bregman divergence calculation set forth in the following equation:

$$B(p \mid q) = \sum_{j=0}^{n-1} \sum_{i=0}^{M} [\text{LLR}\_p(i) - \text{LLR}\_q(i)]$$

(block 555). This yields ID*.

A worst_ID variable is set equal to the maximum of ID*, IDi, and IDj (block 560), and it is determined whether ID* is equal to the worst_ID (block 565). Where ID* is equal to the worst_ID, then the two parent maps (pi, pj) were both better than the mutation map. In such a case (block 565), neither of the parent maps (pi, pj) is replaced by the mutation map. Otherwise, where one of the parent maps (pi, pj) was the worst (block 565), it is replaced by the mutation mapping, p* (block 570).

It is then determined whether a maximum number of generations have passed (block 575). In one embodiment of the present invention, the maximum number of generations is one thousand. Where the maximum number of generations has not yet passed (block 575), the processes of blocks 535 through 575 are repeated using pi, pj after the replacement. Otherwise, where the maximum number of generations have passed (block 575), the pi map is stored as a shaping map in the mapping memory (block 580). This shaping map is used during standard operation to remap detected outputs (see block 440 of FIG. 4a).

It should be noted that the various blocks discussed in the above application may be implemented in integrated circuits along with other functionality. Such integrated circuits may include all of the functions of a given block, system or circuit, or a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the invention provides novel systems, devices, methods and arrangements for out of order data processing. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A data processing system, the data processing system comprising:
    a data detector circuit operable to apply a data detection algorithm to a data set to yield a detected output;
    a data shaping circuit operable to:
        generate a shaping map based at least in part on a genetic algorithm during a training mode;
        reshape the detected output using the shaping map to yield a shaped output during an operational mode; and
    a data decoder circuit operable to apply a data decoding algorithm to a decoder input derived from the shaped output to yield a decoded output.

2. The data processing system of claim 1, wherein the data shaping circuit comprises:
    a mapping memory operable to store the shaping map; and
    a soft data mapping circuit operable to select a replacement symbol from the mapping memory based upon a detected symbol from the detected output on a symbol by symbol basis to yield a replacement set, wherein the decoder input derived from the shaped output is the replacement set.

3. The data processing system of claim 1, wherein the data decoding algorithm is a low density parity check algorithm.

4. The data processing system of claim 1, wherein the data shaping circuit comprises:
    a genetic algorithm based calculation circuit operable to:
        select a first map and a second map;
        generate a mutation map based at least in part on a combination of the first map and the second map;
        remap the detected output using the first map to yield a first output;
        remap the detected output using the second map to yield a second output; and
        remap the detected output using the mutation map to yield a mutation output.

5. The data processing system of claim 4, wherein the data shaping circuit further comprises:
    a quality determination circuit operable to:
        calculate a first quality metric based at least in part on the first output;

calculate a second quality metric based at least in part on the second output; and calculate a third quality metric based at least in part on the mutation output.

6. The data processing system of claim 5, wherein:

the first quality metric is a first information divergence value calculated based at least in part on a combination of the first output and an ideal output;

the second quality metric is a second information divergence value calculated based at least in part on a combination of the second output and the ideal output; and the third quality metric is a third information divergence value calculated based at least in part on a combination of the mutation output and the ideal output.

7. The data processing system of claim 5, wherein the genetic algorithm based calculation circuit is further operable to:

replace the first map with the mutation map when the first quality metric is worse than both the second quality metric and the third quality metric; and replace the second map with the mutation map when the second quality metric is worse than both the first quality metric and the third quality metric.

8. The data processing system of claim 7, wherein the data shaping circuit further comprises:

a soft data mapping circuit operable to store the first map to a mapping memory as the shaping map.

9. The data processing system of claim 1, wherein the system is implemented as an integrated circuit.

10. The data processing system of claim 1, wherein the system is implemented as part of device selected from a group consisting of: a storage device, and a communication device.

11. The data processing system of claim 1, wherein the data detector circuit is selected from a group consisting of: a maximum a posteriori data detector circuit, and a Viterbi algorithm data detector circuit.

12. A method for data processing, the method comprising:

receiving a data set;

applying a data detection algorithm by a data detector circuit to the data set to yield a detected output;

generating a shaping map based at least in part on a genetic algorithm during a training mode;

reshaping the detected output using the shaping map to yield a shaped output during an operational mode;

storing the shaping map to a mapping memory; and wherein reshaping the detected output includes selecting a replacement symbol from the mapping memory based upon a detected symbol from the detected output on a symbol by symbol basis to yield a replacement set.

13. The method of claim 12, the method further comprising:

selecting a first map;

selecting a second map;

generating a mutation map based at least in part on a combination of the first map and the second map;

remapping the detected output using the first map to yield a first output;

remapping the detected output using the second map to yield a second output; and remapping the detected output using the mutation map to yield a mutation output.

14. The method of claim 13, the method further comprising:

calculating a first quality metric based at least in part on the first output;

calculating a second quality metric based at least in part on the second output; and calculating a third quality metric based at least in part on the mutation output.

15. The method of claim 14, wherein:

the first quality metric is a first information divergence value calculated based at least in part on a combination of the first output and an ideal output;

the second quality metric is a second information divergence value calculated based at least in part on a combination of the second output and the ideal output; and the third quality metric is a third information divergence value calculated based at least in part on a combination of the mutation output and the ideal output.

16. The method of claim 14, the method further comprising:

replacing the first map with the mutation map when the first quality metric is worse than both the second quality metric and the third quality metric; and replacing the second map with the mutation map when the second quality metric is worse than both the first quality metric and the third quality metric.

17. The method of claim 16, the method further comprising:

storing the first map to a mapping memory as the shaping map.

18. A storage device, the storage device comprising:

a storage medium;

a head assembly disposed in relation to the storage medium and operable to provide a sensed signal corresponding to a first data set on the storage medium and a second data set on the storage medium a read channel circuit including:

an analog front end circuit operable to provide an analog signal corresponding to the sensed signal;

an analog to digital converter circuit operable to sample the analog signal to yield a series of digital samples;

an equalizer circuit operable to equalize the digital samples to yield a data set;

a data detector circuit operable to apply a data detection algorithm to the data set to yield a detected output;

a data shaping circuit operable to:

generate a shaping map based at least in part on a genetic algorithm during a training mode; and reshape the detected output using the shaping map to yield a shaped output during an operational mode.

19. The storage device of claim 18, wherein the data shaping circuit comprises:

a mapping memory operable to store the shaping map; and a soft data mapping circuit operable to select a replacement symbol from the mapping memory based upon a detected symbol from the detected output on a symbol by symbol basis to yield a replacement set.

20. The storage device of claim 19, wherein the storage device further comprises:

a data decoder circuit operable to apply a data decoding algorithm to a decoder input derived from the replacement set to yield a decoded output.

* * * * *